(12) United States Patent
Endo

(10) Patent No.: US 6,999,121 B2
(45) Date of Patent: Feb. 14, 2006

(54) IDLE READ OF CONVERSION ELEMENT IN RADIATION IMAGE PICK-UP APPARATUS

(75) Inventor: Tadao Endo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 10/006,688

(22) Filed: Dec. 10, 2001

(65) Prior Publication Data

US 2002/0101527 A1    Aug. 1, 2002

(30) Foreign Application Priority Data

Dec. 14, 2000    (JP) ............................. 2000-380570

(51) Int. Cl.
*H04N 3/14*    (2006.01)
*H04N 5/335*    (2006.01)

(52) U.S. Cl. .................................... 348/297; 250/370.9

(58) Field of Classification Search ................ 348/302, 348/307, 310; 250/370.09, 367, 483, 461; 378/98
See application file for complete search history.

(56) References Cited

U.S. PATENT DOCUMENTS

| 5,661,309 | A | * | 8/1997 | Jeromin et al. ............. 250/580 |
| 5,753,921 | A | * | 5/1998 | Trauernicht et al. ... 250/370.09 |
| 5,818,898 | A | * | 10/1998 | Tsukamoto et al. ........ 378/98.8 |
| 5,886,353 | A | * | 3/1999 | Spivey et al. .......... 250/370.09 |
| 6,339,633 | B1 | * | 1/2002 | Hull et al. ..................... 378/91 |
| 6,429,463 | B1 | * | 8/2002 | Mauk .......................... 257/98 |
| 6,801,598 | B1 | * | 10/2004 | Tashiro et al. ............. 378/98.8 |
| 2002/0074929 | A1 | * | 6/2002 | Taskar et al. ............... 313/467 |

* cited by examiner

*Primary Examiner*—David L. Ometz
*Assistant Examiner*—Hung Lam
(74) *Attorney, Agent, or Firm*—Fitzpatrick, Cella, Harper & Scinto

(57) ABSTRACT

A radiation image pick-up apparatus includes a conversion element, accumulation element, read element, detection element, driving circuit, and controller. The conversion element converts radiation into an electrical signal. The accumulation unit accumulates the electrical signal converted by the conversion element. The read unit reads out the electrical signal accumulated in the accumulation unit. The detection element detects the start and end of irradiation of the radiation. The driving circuit accumulates the electrical signal in the accumulation element responsive to the detection of start of irradiation of the radiation, and drives the read element responsive to the detection of the end of irradiation of the radiation, based on the detection result of the detection element. The controller controls the driving circuit. A radiation image pick-up system is also disclosed.

15 Claims, 14 Drawing Sheets

IDLE READ OF CONVERSION ELEMENT IN RADIATION IMAGE PICK-UP APPARATUS

BACKGROUND OF THE INVENTION

1. Field of the Invention

The present invention relates to a radiation image pick-up apparatus and system and, more particularly, to a radiation image pick-up apparatus and system used for medical diagnosis and industrial nondestructive examination.

In this specification, radiation includes electromagnetic waves such as an X-ray, α-ray, β-ray and γ-ray.

2. Related Background Art

Conventional X-ray image pick-up systems installed in a hospital and the like include an analog type system for irradiating a patient with X-rays and exposing a film to X-rays having passed through the patient, and a digital type system for converting X-rays having passed through a patient into electrical signals and accumulating the electrical signals.

FIG. 16 is a block diagram showing the schematic arrangement of a conventional analog X-ray image pick-up system. In FIG. 16, an X-ray source 101 emits X-rays. An X-ray generation device 104 generates X-rays to be emitted by the X-ray source 101. A switch 105 is generally opened/closed by a radiation technician to control emission of X-rays. X-ray information of an object 102 to be examined such as a patient is recorded on a film 120. Phosphor screens 103 convert X-rays having passed through the object 102 into light such as visible light.

The film 120 is not sensitive to the X-ray wavelength range, so that the film system interposes the phosphor screen 103 between the film 120 and the object 102. The film 120 senses the intensity of visible light or the like converted by the phosphor screen 103, forming an image as X-ray information of the object 102.

The phosphor screens 103 are tightly adhered to the film 120 with an adhesive so as not to decrease the sharpness of an X-ray image on the film 120. Two phosphor screens 103 are arranged on the front and back sides of the film 120 so as to obtain a high-quality X-ray image.

FIG. 17 is a block diagram showing the schematic arrangement of a conventional digital X-ray image pick-up system. Instead of the film 120 in FIG. 16, the X-ray image pick-up system shown in FIG. 17 adopts a solid-state image pick-up device 130 having a CCD image pick-up element or MOS image pick-up element for converting X-rays having passed through the object 102, and a controller 140 for controlling driving of the solid-state image pick-up device 130 in accordance with a control signal transmitted along with opening/closing of a switch 105. In FIG. 17, the same reference numerals as in FIG. 16 denote the same parts.

If the switch 105 is unintentionally closed in the X-ray image pick-up system shown in FIG. 17, the X-ray generation device 104 transmits a control signal to the controller 140 in order to synchronize the driving timing of the solid-state image pick-up device 130 with the emission timing of X-rays.

If X-ray information of a patient is to be used for diagnosis by a doctor or the like in the analog X-ray image pick-up system, X-ray information of the patient on the film must be developed, which requires a developing time after image pick-up by a radiation technician to diagnosis by the doctor. This also requires cumbersome processing of a waste developing solution and a space for stocking films.

In the digital X-ray image pick-up system, the X-ray generation device 104 and controller 140 are wired in order to transmit a control signal from the X-ray generation device 104 to the controller 140 so as to establish synchronization. The wiring obstructs image pick-up particularly when the solid-state image pick-up device is to be used as a light-weight low-profile image pick-up device such as a film cassette. Such an image pick-up device is not easy to carry, and may decrease the image pick-up efficiency.

When the manufacturer of the X-ray generation device and that of the solid-state image pick-up device are different, an interface circuit must be prepared in some cases in order to enable transmission/reception of control signals. To replace, e.g., an X-ray source used with one of another manufacturer after an X-ray image pick-up system is installed in a hospital, an interface for allowing transmission/reception of control signals to/from a new X-ray source is undesirably required.

In the emergency medical field, a portable lightweight low-profile cassette is convenient when a space is limited as in an ambulance or when a doctor or the like is to acquire X-ray information of a patient even in a place remote from the hospital. At this time, demands are arising for an X-ray image pick-up system which does not use electrical wiring as much as possible.

SUMMARY OF THE INVENTION

It is an object of the present invention object to provide a radiation image pick-up apparatus and system capable of eliminating wiring between a radiation source and a radiation image pick-up apparatus.

To achieve the above object, a radiation image pick-up apparatus comprises conversion means for converting radiation into an electrical signal, accumulation means for accumulating the electrical signal converted by the conversion means, read means for reading out the electrical signal accumulated in the accumulation means, detection means for detecting start and end of irradiation of the radiation, a driving circuit for accumulating the electrical signal in the accumulation means responsive to detection of the start of irradiation of the radiation, and driving the read means responsive to detection of the end of irradiation of the radiation, based on a detection result of the detection means, and control means for controlling the driving circuit.

Idling operation of the conversion element by the control means before accumulation operation can preferably stabilize driving of the conversion element. A method of driving a radiation image pick-up apparatus for obtaining image information by converting radiation which irradiates an object to be examined into an electrical signal by a conversion element for converting the radiation into an electrical signal comprises an accumulation operation of detecting start of irradiation of the radiation and accumulating the converted electrical signal, a read operation of detecting end of irradiation of the radiation and reading out the accumulated electrical signal, and an idling operation of performing idle read of the conversion element before the accumulation operation.

The above and other objects, features and advantages of the present invention will be apparent from the following description in conjunction with the accompanying drawings.

DETAILED DESCRIPTION OF THE PREFERRED EMBODIMENTS

Preferred embodiments of the present invention will be described below with reference to the accompanying drawings.

(First Embodiment)

Figure 1:
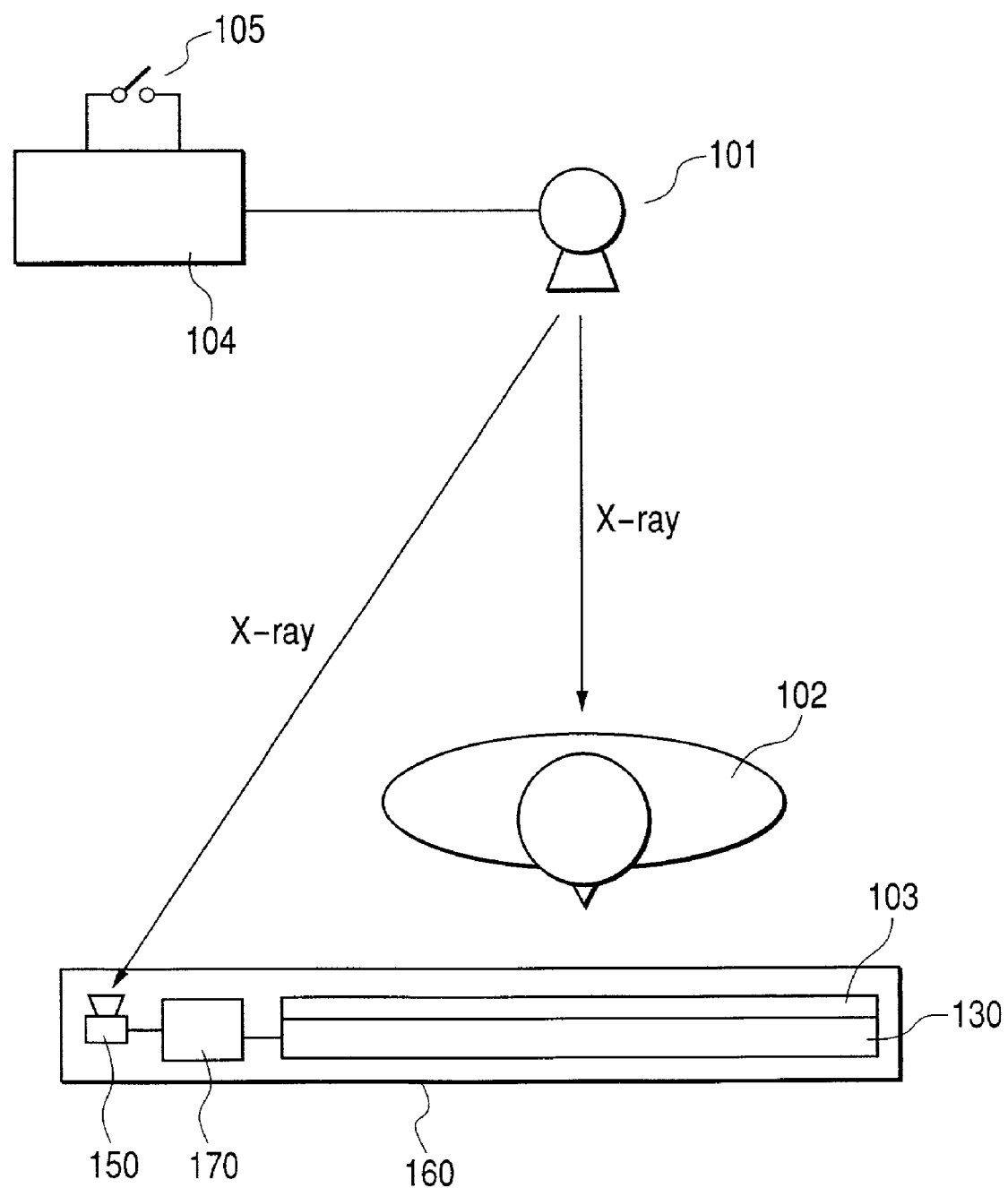
FIG. 1 is a view showing an X-ray image pick-up system according to the first embodiment of the present invention.

FIG. 1 is a view showing an X-ray image pick-up system according to the first embodiment of the present invention. In FIG. 1, an X-ray source 101 emits X-rays. An X-ray generation device 104 generates X-rays to be emitted by the X-ray source 101. A switch 105 is generally opened/closed by a radiation technician to control emission of X-rays. Phosphor screens 103 convert X-rays having passed through an object 102 to be examined into light such as visible light. A solid-state image pick-up device 130 has a photoelectric conversion element for converting light converted by the phosphor screen 103 into an electrical signal, an accumulation means for accumulating the converted electrical signal in a capacitance between electrodes, and a read means for reading out the accumulated electrical signal. An X-ray detection element 150 serves as a detection means for detecting emission/non-emission of X-rays from the X-ray source 101. A controller 170 incorporates a driving circuit for driving the solid-state image pick-up device 130 in various modes in accordance with the detection result of the X-ray detection element 150, and controls the driving circuit. A chassis 160 supports the phosphor screen 103, solid-state image pick-up device 130, controller 170 and X-ray detection element 150, and is made of a metal such as aluminum or stainless steel which easily transmits X-rays. For example, as the controller 170, an IC chip circuit may be used.

The solid-state image pick-up device 130 uses photoelectric conversion elements, and CCD image pick-up elements or MOS image pick-up elements for accumulating and reading out electrical signals converted by the photoelectric conversion elements. The photoelectric conversion elements and image pick-up elements are two-dimensionally arrayed. The X-ray detection element 150 may use a CCD image pick-up element or MOS image pick-up element, or may be simply constituted by sandwiching between electrode layers a photoelectric conversion layer for directly converting, e.g., GaAs radiation into electric charges because the X-ray detection element 150 suffices to detect only the start and end of irradiation of the radiation.

The phosphor screen 103 is made of $Gd_2O_2S$, $Gd_2O_3$, or CsI as a major component. More specifically, the phosphor screen 103 for converting X-rays into visible light can be made of $Gd_2O_2S$:Tb or CsI:Tl as a compound with Tb (terbium) or Tl (thallium).

In FIG. 1, X-rays directly enter the X-ray detection element 150 from the X-ray source 101 for illustrative convenience. X-rays may enter the X-ray detection element 150 via the object 102 when the X-ray detection element 150 is attached to the solid-state image pick-up device 130.

X-rays emitted by the X-ray source 101 enter the object 102 and X-ray detection element 150. X-rays having passed through the object 102 reach the phosphor screen 103. When the X-ray detection element 150 receives X-rays, it detects emission of X-rays from the X-ray source 101, and outputs a signal representing this emission to the controller 170. Upon reception of this signal, the controller 170 uses an internal driving circuit to cause the solid-state image pick-up device 130 to perform three operations: "idle read operation", "accumulation operation" and "real read operation" (to be described later).

The phosphor screen 103 converts X-rays having passed through the object 102 into visible light corresponding to the X-ray transmission amount. The converted light is sent to the solid-state image pick-up device 130 where the light is converted into an electrical signal. This electrical signal represents the X-ray transmission image of the object 102.

The photoelectric conversion element of the solid-state image pick-up device 130 executes three operations: "idle read operation", "accumulation operation" and "real read operation".

First, the image pick-up apparatus is powered on. When the X-ray source 101 does not emit any X-rays, idle read operation is performed. The detection element 150 detects whether X-rays are emitted at this time.

Then, the switch 105 is closed (turned on) to start emission of X-rays from the X-ray source 101. If the start of emission is detected by the X-ray detection element 150, the solid-state image pick-up device 130 starts accumulation operation under the control of the controller 170. More specifically, idle read operation ends.

After that, the switch 105 is opened (turned off) to stop X-rays emitted by the X-ray source 101. If the end of emission is detected by the X-ray detection element 150, the solid-state image pick-up device 130 starts real read operation under the control of the controller 170.

Details of idle read operation, accumulation operation and real read operation will be described later.

Figure 2:
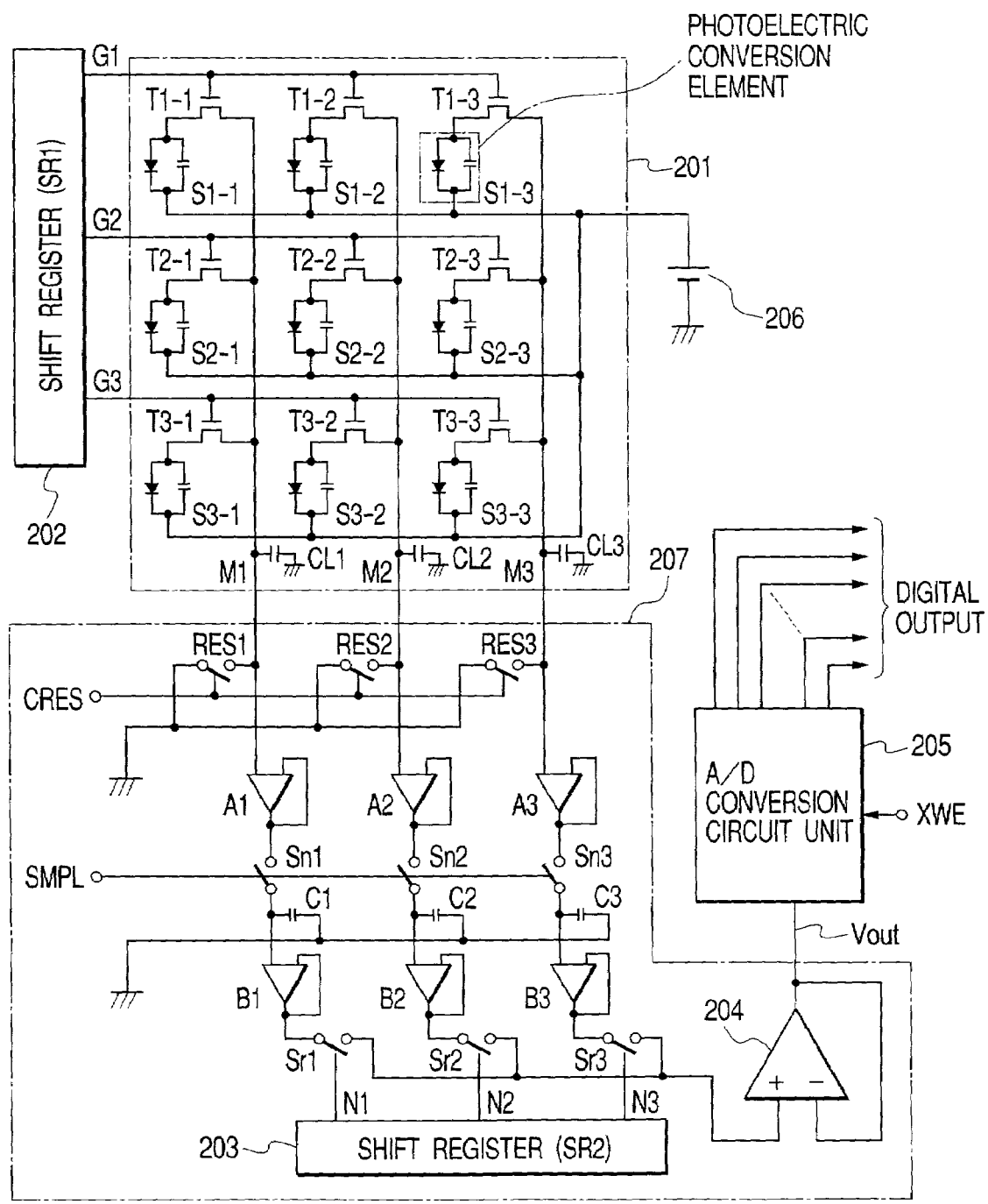
FIG. 2 is a circuit diagram showing a solid-state image pick-up device in FIG. 1 and its periphery.

FIG. 2 is a circuit diagram showing the solid-state image pick-up device 130 in FIG. 1 and its periphery. A two-dimensional array of photoelectric conversion elements will be exemplified. For descriptive convenience, the solid-state image pick-up device 130 is made up of a total of nine pixels in a 3×3 array in FIG. 2. In practice, a plurality of photoelectric conversion elements are arrayed in accordance with a necessary sensor size. For example, for a medical chest X-ray image pick-up apparatus, 2,000×2,000 pixels or more are arrayed for 40 CM or more in the effective region at a pixel pitch of 200 MM. The solid-state image pick-up device 130 comprises a photoelectric conversion circuit unit 201, a shift register 202 for transferring the signal charges of each pixel, a shift register 203 for sequentially reading out electric charges from each signal line, an amplifier 204, an A/D conversion circuit unit 205, a bias application power supply 206 and a read circuit unit 207.

Photoelectric conversion elements S1-1 to S3-3 receive visible light and convert it into electrical signals. Switching elements T1-1 to T3-3 transfer signal charges photoelectrically converted by the photoelectric conversion elements S1-1 to S3-3 to matrix signal lines M1 to M3. Gate driving lines G1 to G3 of the switches are connected to the switching elements T1-1 to T3-3. An accumulation capacitance is formed in each photoelectric conversion element in FIG. 2, but may be formed separately from the photoelectric conversion element.

The matrix signal line M1 is equivalent to three capacitances (CGS) between the electrodes of the switching elements that are added at the end of transfer. In FIG. 2, these capacitances are represented by a capacitance element CL1. This also applies to the remaining matrix signal lines M2 and M3, and their capacitances are represented by CL2 and CL3.

FIG. 2 shows as the photoelectric conversion circuit unit 201 the photoelectric conversion elements S1-1 to S3-3, switching elements T1-1 to T3-3, gate driving lines G1 to G3, and matrix signal lines M1 to M3, which are formed on an insulating substrate (not shown). The shift register (SR1) 202 controls ON/OFF operation of the switching elements T1-1 to T3-3.

Incident radiation is converted into electrical signals, which are accumulated in capacitances between electrodes. The photoelectrically converted signals are changed into parallel voltage outputs via the transfer switches T1-1 to T3-3 and matrix signal lines M1 to M3.

These outputs are changed into a serial signal by the read circuit unit 207 serving as a read means. The serial signal is output to the A/D conversion circuit unit 205 serving as an analog-to-digital converter where the analog signal is converted into a digital signal. In the solid-state image pick-up device of FIG. 2, photoelectric conversion elements for a total pixel number of 9 bits are classified into three rows each having 3 bits. The above-described operations are sequentially executed row by row.

Figure 3:
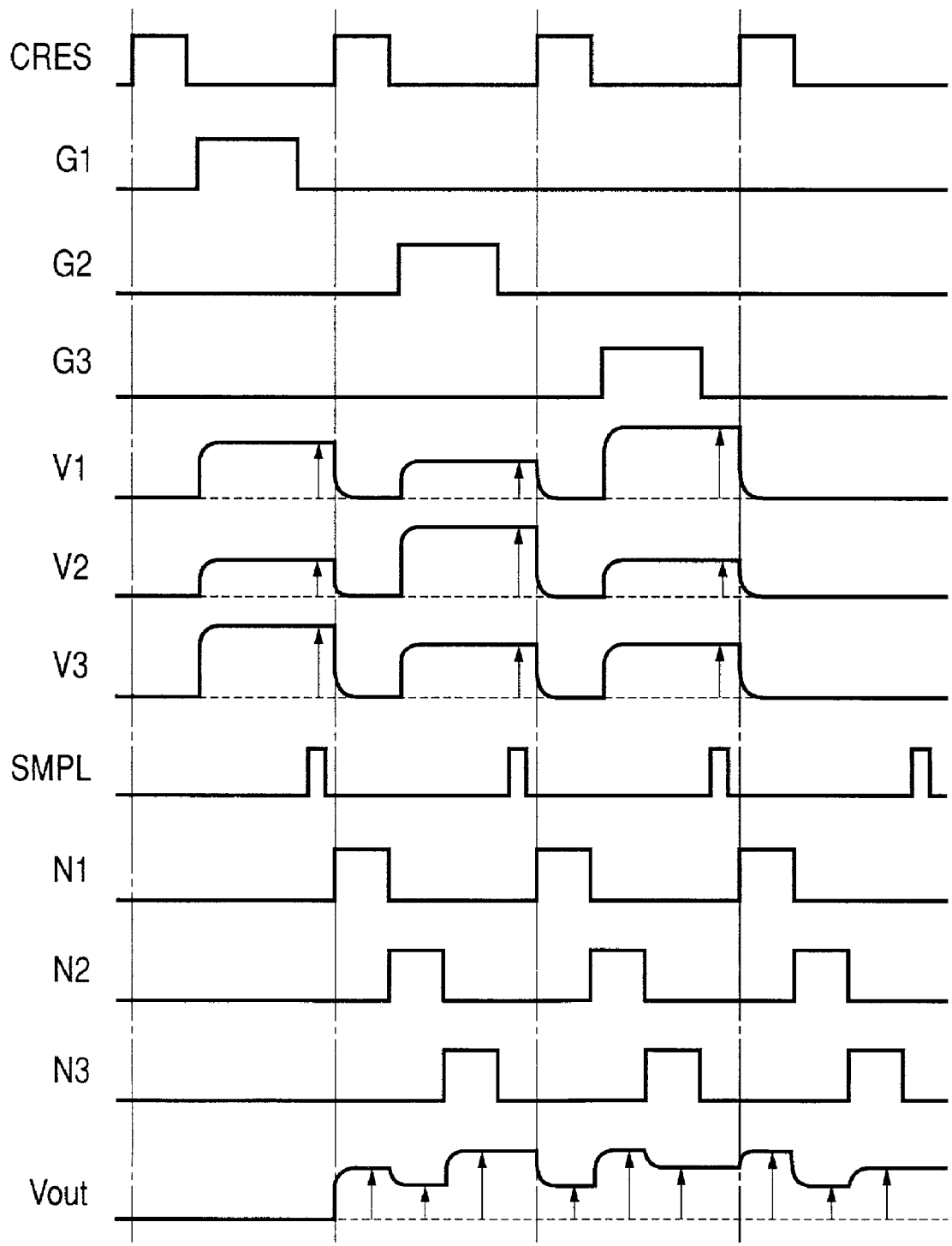
FIG. 3 is a timing chart showing the operation of the solid-state image pick-up device shown in FIG. 2.

FIG. 3 is a timing chart showing the operation of the solid-state image pick-up device shown in FIG. 2. Light incident on the photoelectric conversion elements S1-1 to S1-3 on the first row is converted into electrical signals, which are accumulated as signal charges in capacitances between electrodes by the accumulation means. After the lapse of a predetermined accumulation time, the shift register 202 supplies a first voltage pulse G1 for transfer to the gate driving line G1 for a time T1, thereby turning on the transfer switching elements T1-1 to T1-3.

Then, signal charges accumulated in the capacitances between the electrodes in the photoelectric conversion elements S1-1 to S1-3 are transferred to the parasitic capacitances CL1 to CL3 of the matrix signal lines M1 to M3. Potentials V1 to V3 of the capacitances CL1 to CL3 rise by the signal charge amounts (transfer operation).

Electric charges in the capacitances CL1 to CL3 are transferred to sample-and-hold capacitances C1 to C3 within a read circuit unit by enabling a SMPL signal. At this time, the signals of the capacitances CL1 to CL3 are amplified by amplifiers A1 to A3.

By disabling the SMPL signal, the signal charges of the sample-and-hold capacitances C1 to C3 are held. After the SMPL signal is disabled, the capacitances CL1 to CL3 are reset by a CRES signal, and transfer operation for the next line is executed.

The signals on the first row sampled and held by the sample-and-hold capacitances C1 to C3 are converted into serial signals via amplifiers B1 to B3 by sequentially supplying voltage pulses from the shift register (SR2) 203 to gate driving lines N1 to N3 and sequentially turning on read switches SR1 to SR3. After the impedances are converted by the operational amplifier 204, the signals of three pixels are output outside the photoelectric conversion device (read operation).

The gate driving lines G2 and G3 are sequentially driven by the shift register 202 to output data of all the pixels. Photoelectrically converted signals of the three rows are repetitively read out.

FIGS. 2 and 3 show nine pixels, but the operation is the same even for a larger number of pixels. The use of the sample-and-hold capacitances C1 to C3 enables performing read operation of the N-th row and transfer operation of the (N+1)th row within the same period.

Figure 4:
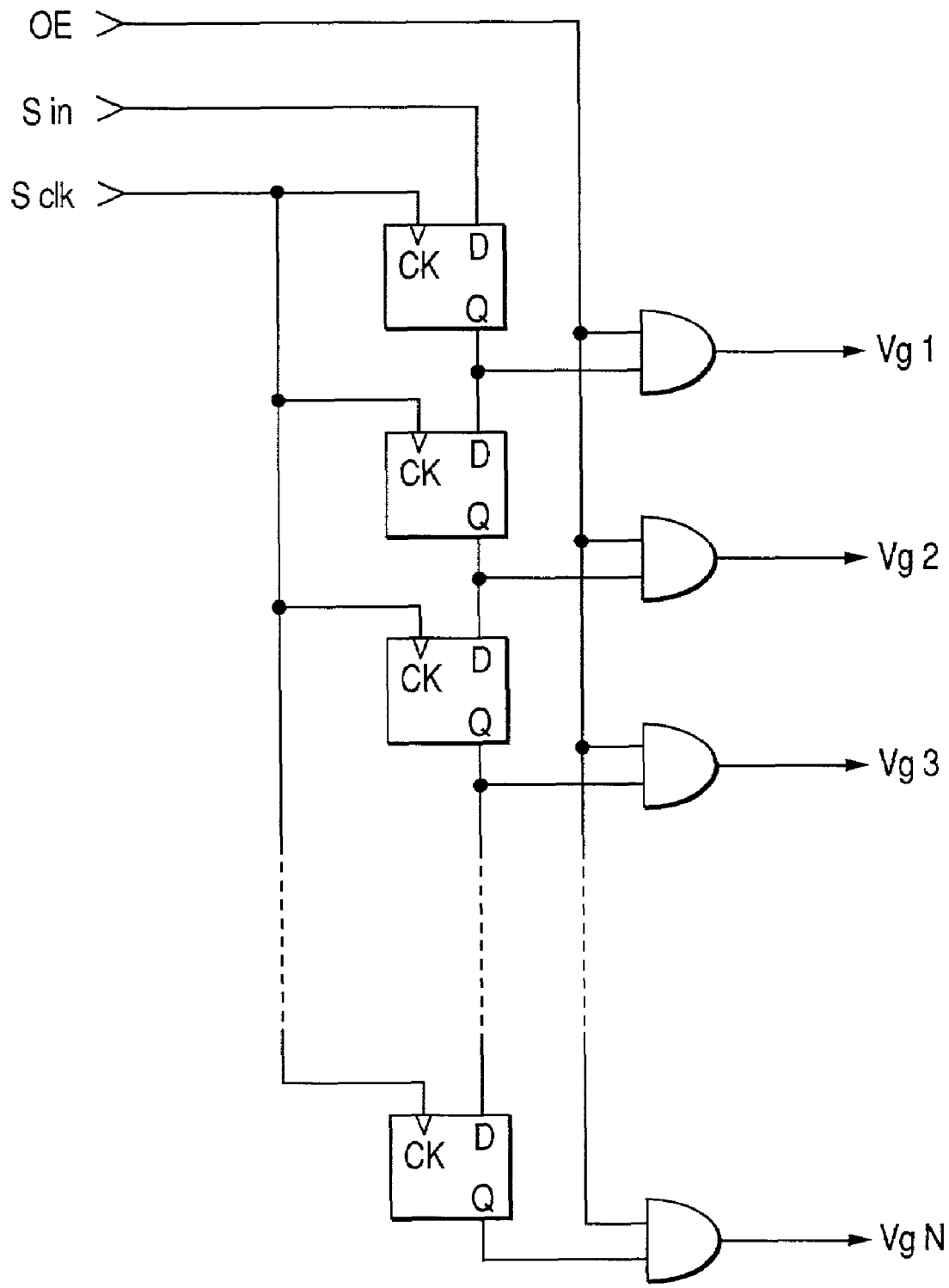
FIG. 4 is a circuit diagram showing a shift register (SR1) in FIG. 2.

FIG. 4 is a circuit diagram showing the shift register 202 in FIG. 2. FIG. 4 shows N D-flip-flops and AND gates. There are three input logic signals Sin, Sclk and OE, and there are N output signals Vg1 to VgN.

Figure 5:
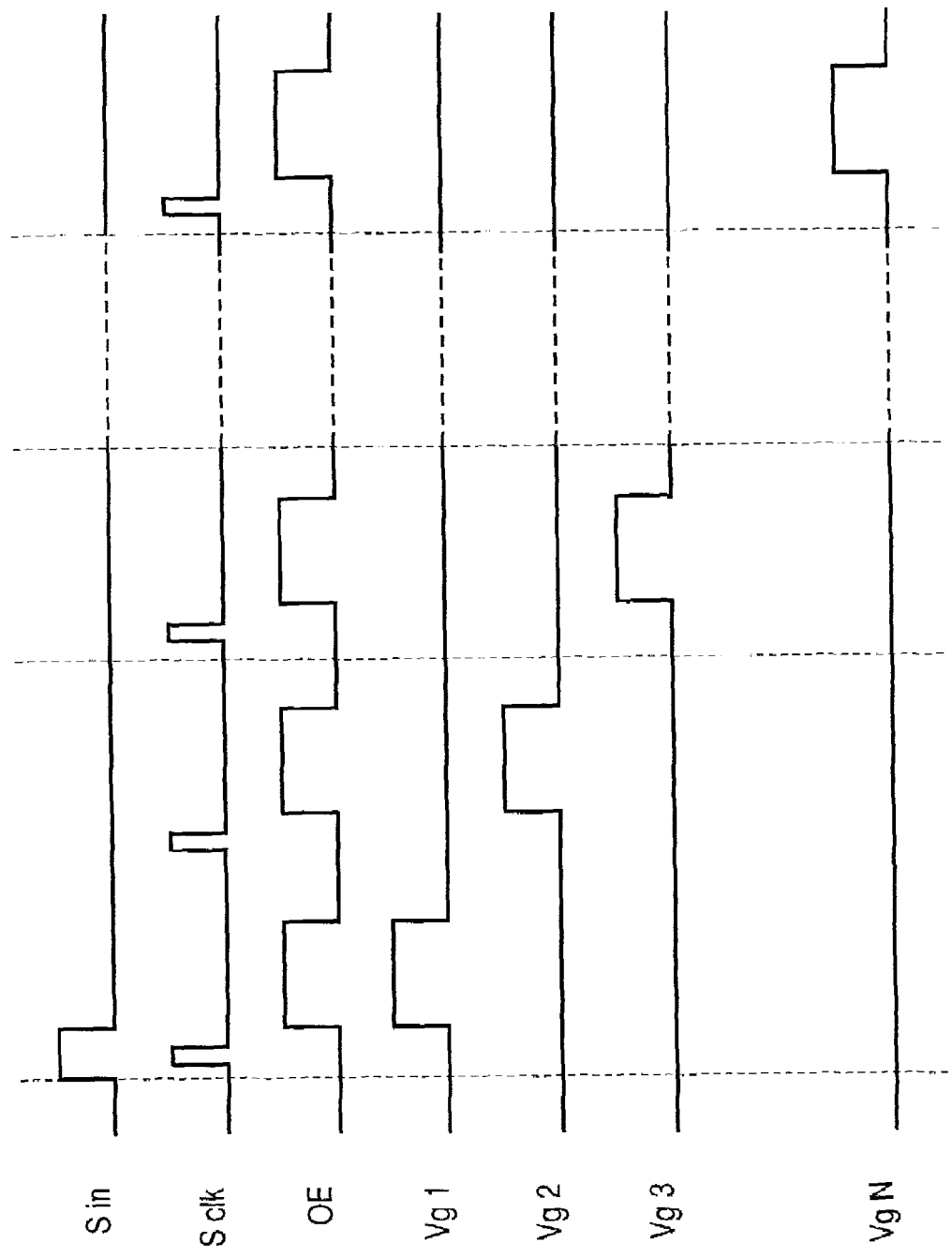
FIG. 5 is a timing chart showing the operation of the shift register (SR1) in FIG. 4.

FIG. 5 is a timing chart showing the operation of the shift register (SR1) in FIG. 4. By changing Sclk to "HI" while changing Sin to "HI", the first D-flip-flop changes to "HI". By changing OE to "HI" after changing Sclk to "LO" and Sin to "LO", the output Vg1 of the first AND circuit outputs a "HI" pulse in synchronism with OE.

Since the output ("HI") of the first D-flip-flop is connected to the D input of the second D-flip-flop, the second D-flip-flop changes to "HI" by changing Sclk to "HI". Since Sin as the D input terminal of the first D-flip-flop is at "LO", the first D-flip-flop has changed to "LO". By changing OE to "HI" again, the output Vg2 of the second AND circuit outputs a "HI" pulse in synchronism with OE. Similarly, pulses are output in synchronism with OE up to the N-th VgN.

Although not shown in FIG. 4, ON and OFF voltages necessary for switching the ON/OFF state of the switching element in FIG. 2 are formed into desired ones by disposing a voltage level conversion circuit on the output side of the AND circuit.

Three operations: "idle read operation", "accumulation operation" and "real read operation" representing the operations of the photoelectric conversion elements S1-1 to S3-3 will be explained. In "real read operation", each photoelectric conversion element executes scan of one frame, and the X-ray image of the object 102 is acquired. This operation is performed while signal charges for obtaining image information are accumulated in an accumulation capacitance.

In "idle read operation", each photoelectric conversion element executes scan of one frame. However, this operation is not for acquiring the X-ray image of the object 102, but for reducing variations in the characteristics of each photoelectric conversion element, particularly in dark current component, thereby stabilizing "real read operation". The "idle read operation" means idling operation.

In "accumulation operation", signal charges photoelectrically converted by irradiation with X-rays after "idle read operation" are accumulated in capacitances between electrodes within the photoelectric conversion elements S1-1 to S3-3.

The period during which "real read operation" is performed will be called a "real read period", the period during which "idle read operation" is performed will be called an "idle read period", and the period during which "accumulation operation" is performed will be called an "accumulation period".

Figure 6:
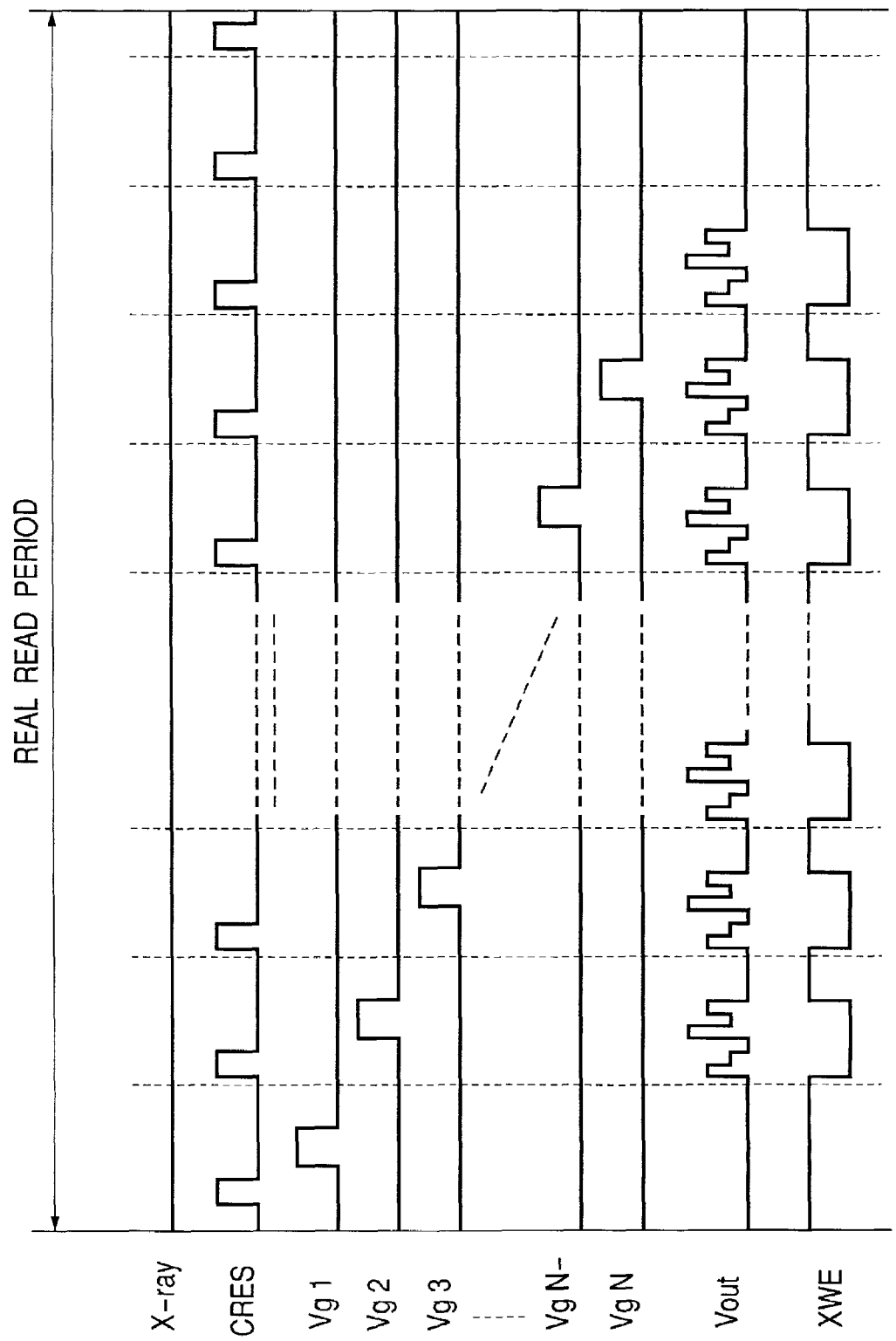
FIG. 6 is a timing chart showing "real read operation" when N shift registers (SR1) are arranged in respective photoelectric conversion elements in FIG. 2.
Figure 7:
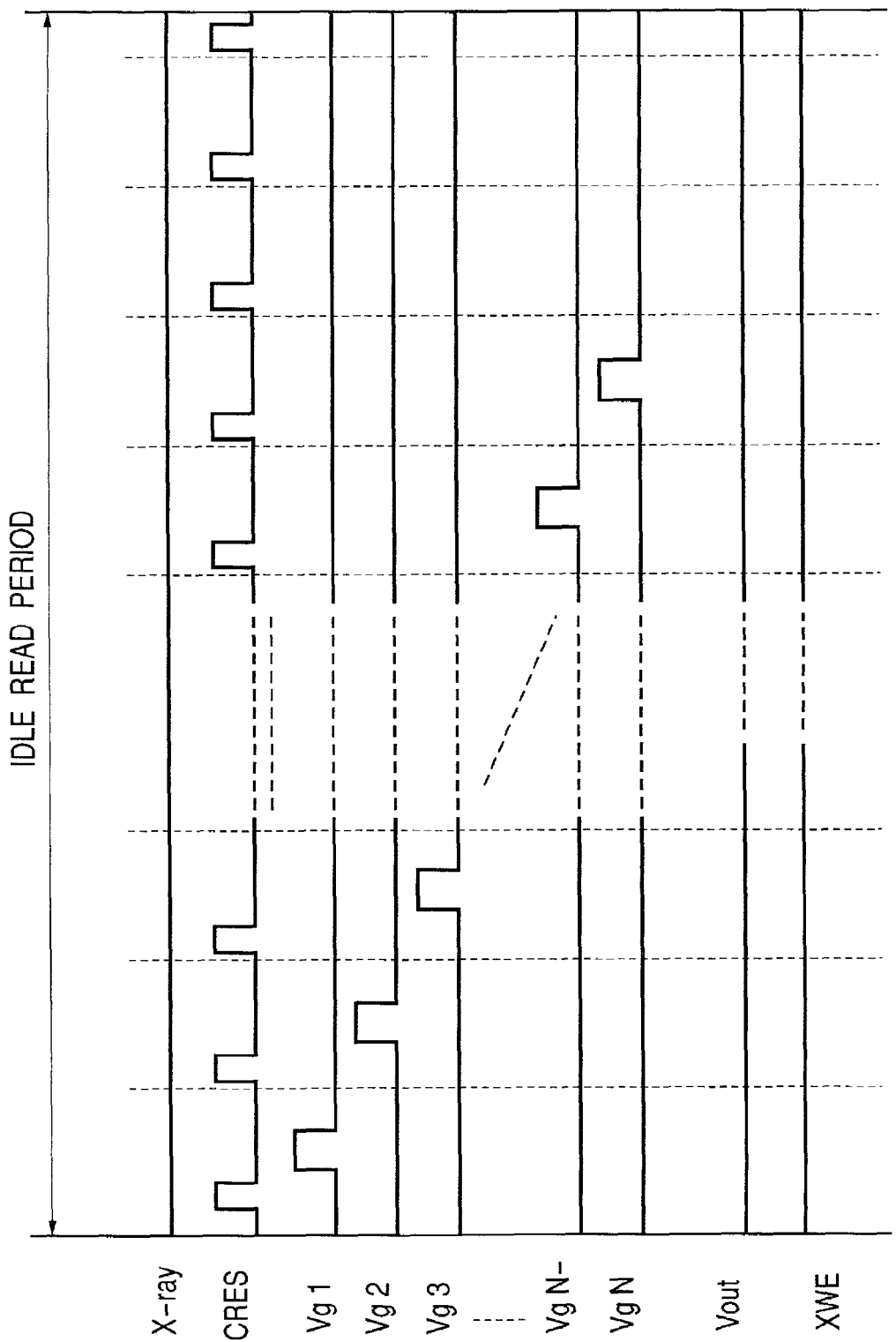
FIG. 7 is a timing chart showing "idle read operation" when N shift registers (SR1) are arranged in respective photoelectric conversion elements in FIG. 2.

FIGS. 6 and 7 are timing charts showing "real read operation" and "idle read operation" when N shift registers 201 are arranged for respective photoelectric conversion elements in FIG. 2. The timings of signals output to Vg1 to VgN in FIGS. 6 and 7 are basically the same as those in FIG. 5.

FIGS. 6 and 7 additionally show X-ray representing emission/non-emission of X-rays from the X-ray source 101, CRES representing HI/LO of a signal supplied to a CRES terminal, Vout representing an analog output from the amplifier 204, and an XWE signal representing HI/LO of a signal input to the A/D conversion circuit unit 205. The XWE signal is a logic signal for executing A/D conversion only when an analog output from each photoelectric conversion element is output from the amplifier 204. No A/D conversion is done when the signal is at HI.

In FIGS. 6 and 7, the signal X-ray is always at LO, and no X-rays are emitted by the X-ray source 101. Signals output to Vg4 to VgN are switched between HI and LO similarly to signals output to Vg1 to Vg3 that have been described with reference to FIG. 5. In FIG. 7, Vout for idle read operation is always at LO, and no signal output from the amplifier 204 is illustrated. That is, the XWE signal is always at HI, and no A/D conversion is performed.

As shown in FIGS. 6 and 7, "real read operation" and "idle read operation" do not have any difference in operating each photoelectric conversion element. As described above, "idle read operation" is idling operation necessary for stabilizing "real read operation" of the photoelectric conversion element, and does not use an output signal itself in this operation as digital data for forming an image.

Figure 8:
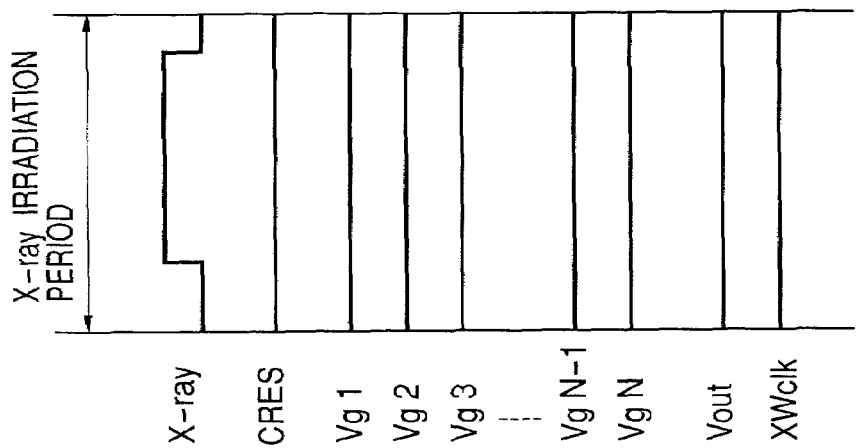
FIG. 8 is a timing chart showing the "X-irradiation of the radiation period" of a photoelectric conversion device.

FIG. 8 is a timing chart showing "accumulation operation" when N shift registers (SR1) are arranged for respective photoelectric conversion elements in FIG. 2. In FIG. 8, the signal X-ray is switched to LO, HI and LO. The X-ray source 101 starts emission of X-rays from a state wherein no X-ray is emitted, and stops emission of X-rays. Vg1 and VgN always receive LO signals. The XWE signal is at HI.

Figure 9:
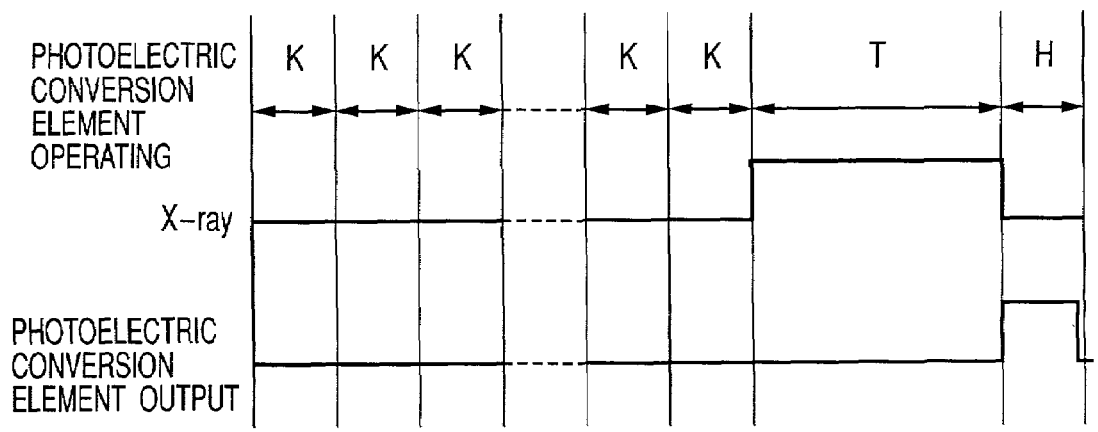
FIG. 9 is a timing chart showing an operation in image pick-up of the X-ray image pick-up system according to the first embodiment of the present invention.

FIG. 9 is a timing chart showing an operation in image pick-up of the X-ray image pick-up system according to the first embodiment. FIG. 9 shows the operation and output of the photoelectric conversion element, and the signal X-ray shown in FIG. 7 and the like. In FIG. 9, idle read operation is represented by "K"; real read operation, by "H"; and accumulation operation, by "T".

The output of the photoelectric conversion element corresponds to Vout in FIG. 6. For descriptive convenience, FIG. 9 shows a case wherein no object 102 exists, i.e., light based on uniform X-rays is incident on the photoelectric conversion element. Vout is intermittent in FIG. 6, but successive in FIG. 9 for illustrative convenience.

The photoelectric conversion element performs idle read operation "K" when the image pick-up apparatus is powered on. If the switch 105 is turned on during this operation, the X-ray source 101 emits X-rays. Then, the X-ray detection element 150 detects the start of emission of X-rays, and the controller 170 causes the photoelectric conversion element to end idle read operation "K" and change to accumulation operation "T".

After X-rays are irradiated for a predetermined period, the switch 105 is turned off to stop emission of X-rays from the X-ray source 101. The X-ray detection element 150 detects the stop of emission of X-rays, and the driving circuit 170 causes the photoelectric conversion element to change from accumulation operation "T" to real read operation "H". During the real read period "H", signal charges accumulated during the accumulation period "T" are output from each photoelectric conversion element.

FIG. 9 shows an image pick-up sequence when X-rays are irradiated immediately after the end of idle read operation "K". Since the end timing of X-irradiation of the radiation is random, irradiation may not end at the end of idle read operation "K" just for one frame.

Figure 10:
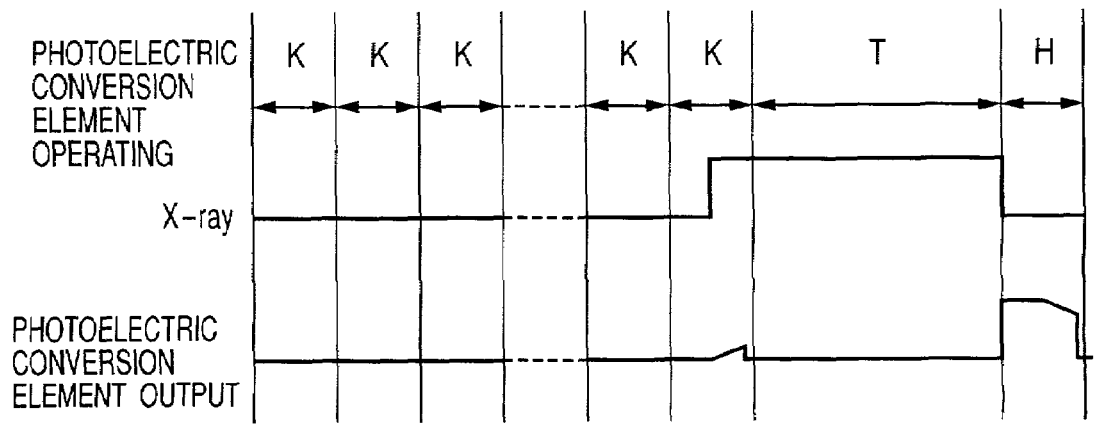
FIG. 10 is a timing chart showing an operation when a switch is turned on during an idle read period "K"

FIG. 10 is a timing chart showing an operation when the switch 105 is closed during the idle read period "K". Similar to FIG. 9, FIG. 10 also shows the analog output waveform of the photoelectric conversion element, and successively shows outputs when no object 102 exists, i.e., uniform X-rays are irradiated for illustrative convenience.

If X-rays are emitted during the idle read period "K", the operation changes to accumulation operation "T" at the end of the idle read period (for one frame), and changes to real read operation "H" after emission of X-rays stops. ON/OFF information of X-rays is based on the detection result of the X-ray detection element 150.

If X-rays are emitted during the idle read period "K", the photoelectric conversion element starts outputting signal charges accumulated by emission of X-rays. This output increases over time and becomes an output of a triangular waveform as shown in FIG. 10. This is because X-rays are irradiated for a long time with the lapse of time and many signal charges are accumulated. That is, the output increases for a pixel column corresponding to the latter half of scan of the shift register 202 in the idle read period "K".

The photoelectric conversion element in the real read period "H" after the accumulation period "T" outputs signal charges corresponding to an irradiated X-ray amount as for a pixel having undergone scan before X-rays are irradiated in the preceding idle read operation "K". Outputs from the subsequent pixel column tend to decrease in comparison with the actually irradiated X-ray amount. This is because accumulated signal charges are lost in scan of the preceding idle read operation.

This output decrease can be compensated for by subsequent processing. The output decrease in the real read period "H" can be easily corrected by detecting the X-irradiation of the radiation start timing and X-ray OFF timing by the X-ray detection element and designing the system in advance in consideration of the known driving timing of the photoelectric conversion element. This correction may be done by software or hardware.

If the accumulation period "T" is much longer than the idle read period "K", the output decrease in the real read period "H" is negligibly small. The accumulation period "T" is determined by a radiation technician or an exposure correction phototimer. In either case, the X-ray detection element 150 can detect the X-ray ON/OFF switching timing. If the accumulation period "T" is much longer than the idle read period "K", correction can be omitted in accordance with a rule coping with a given design.

The first embodiment has exemplified X-rays as radiation, but the present invention is not limited to this. A wavelength converter such as a phosphor screen is adopted as a sensor for detecting radiation, and detects radiation after the radiation is converted into visible light. Alternatively, a material for directly converting radiation into electric charges may also be used. Examples of this material are lead iodide, mercurous iodide, selenium, cadmium telluride, gallium arsenide, gallium phosphide, zinc sulfide and silicon.

According to the arrangement of the first embodiment, the radiation detection element is incorporated in the image pick-up apparatus and detects the start and stop of irradiation without receiving any signal representing the start and end of irradiation from the irradiation of the radiation device. Thus, the radiation source and radiation image pick-up apparatus need not be wired. This enables X-ray image pick-up of a patient regardless of the manufacturer or type of the radiation generation device without preparing any interface circuit. The present invention can be suitably used especially for a portable radiation image pick-up apparatus.

(Second Embodiment)

Figure 11:
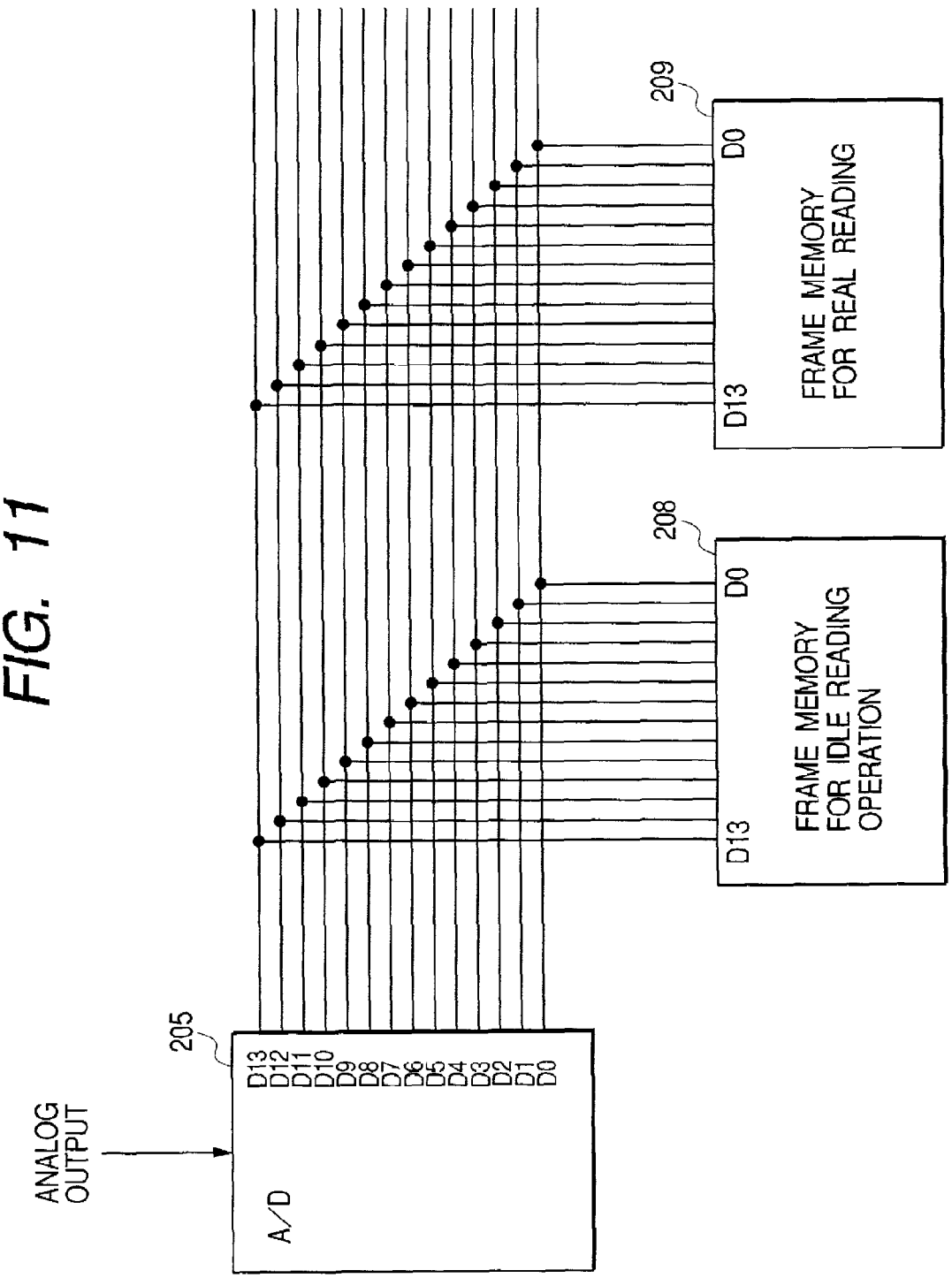
FIG. 11 is a block diagram showing the schematic arrangement of part of an X-ray image pick-up apparatus according to the second embodiment of the present invention.

FIG. 11 is a block diagram showing the schematic arrangement of part of an X-ray image pick-up apparatus according to the second embodiment of the present invention. The second embodiment employs a frame memory 208 for idle reading operation in which data in idle read operation is stored, and a frame memory 209 for real reading in which data in real read operation is stored. The arrangement for converting detected radiation into an analog signal up to an A/D conversion circuit unit is the same as in the first embodiment.

An analog signal which is obtained by converting radiation and contains image information is input to an A/D conversion circuit unit 205. In FIG. 11, the A/D conversion circuit unit 205 is represented by 14 bits. Image data converted into a digital signal by the A/D conversion circuit unit 205 is stored parallel in the frame memories 208 and 209.

The frame memory 208 for idle reading operation stores data every idle read operation, and data in the frame memory 208 is updated every idle read operation. If an X-ray detection element 150 detects the start of emission of X-rays during idle read operation, the current idle read operation becomes the final idle read operation, and the frame memory 208 stores frame data of the final idle read operation.

After the accumulation period "T", real read operation is performed at last, and an output in real read operation is stored in the frame memory 209 for real reading. Then, data in the frame memories 208 and 209 are added to each other. The use of the frame memory 208 for idle reading operation and the frame memory 209 for real reading allows obtaining an X-ray image which hardly varies regardless of the time of the accumulation period "T" even if X-rays are emitted during idle read operation.

Figure 12:
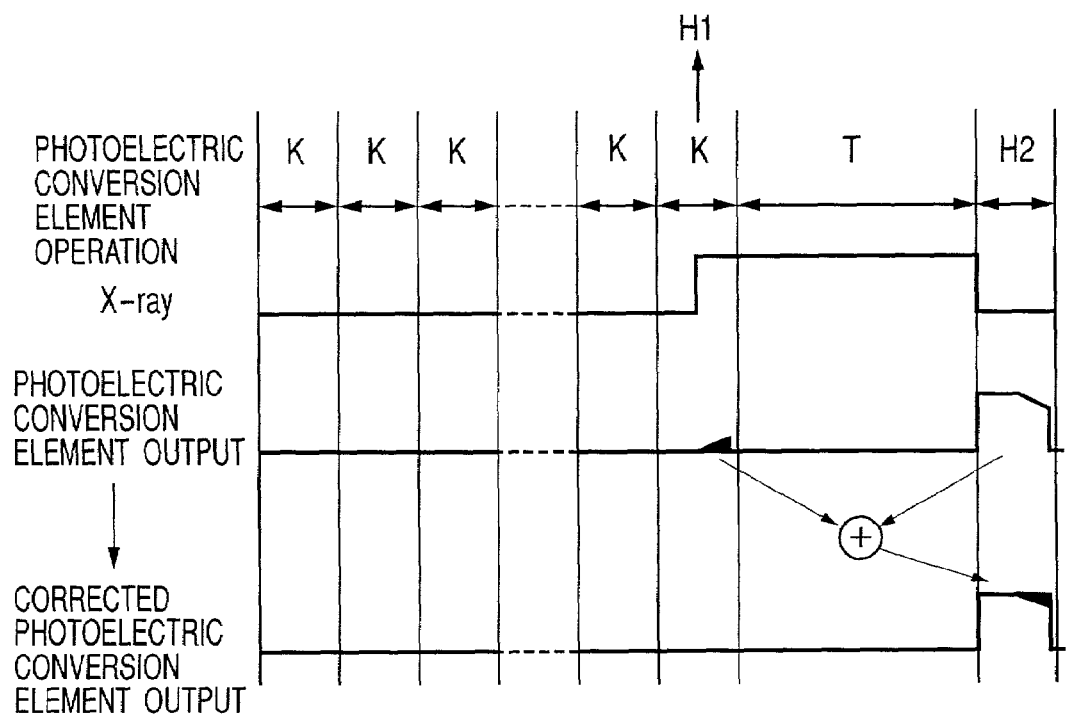
FIG. 12 is a timing chart showing an operation in image pick-up of the X-ray image pick-up system in FIG. 11.

FIG. 12 is a timing chart showing an operation in image pick-up of the X-ray image pick-up system shown in FIG. 11. In the second embodiment, idle read operation is repeated in advance until X-rays are irradiated. Outputs in idle read operation when the X-ray detection element 150 detects emission of X-rays, i.e., in the idle read period "K" immediately before the accumulation period "T" are stored in the frame memory 208, used as image formation information, and added to outputs in real read operation after the accumulation period "T".

FIG. 12 shows a state wherein an output in the final idle read operation is added to an output in real read operation to correct an output from the photoelectric conversion element. In the second embodiment, an output from the photoelectric conversion element in idle read operation immediately before the accumulation period "T" is used as image formation information, and thus A/D-converted similarly to real read operation shown in FIG. 6. That is, real and idle read operations in the second embodiment are the same as that shown in the timing chart of FIG. 6.

According to the second embodiment, an output in real read operation can be corrected by a signal obtained in idle read operation even when X-rays are irradiated during idle read operation of one frame. Hence, an accurate output can be obtained regardless of the irradiation timing.

(Third Embodiment)

Figure 13:
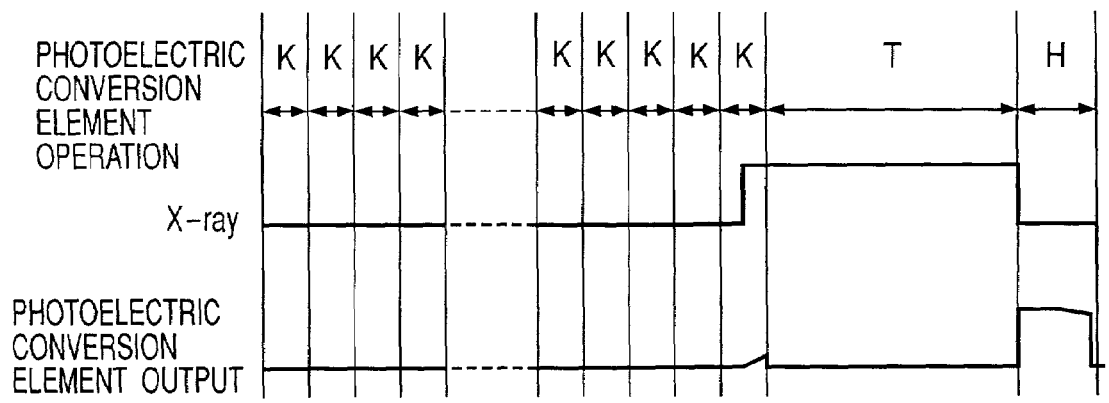
FIG. 13 is a timing chart showing an operation in image pick-up of an X-ray image pick-up system according to the third embodiment of the present invention.

FIG. 13 is a timing chart showing an operation in image pick-up of an X-ray image pick-up system according to the third embodiment of the present invention. In FIG. 10, the time of the idle read period "K" is equal to that of the real read period "H". In the third embodiment, as shown in FIG. 13, the time (Ta) of the idle read period "K" is different from the time (Tr) of the real read period "H", and the real read period "H" is shorter. In other words, the frame frequency fa (Hz) of idle read operation is higher than the frame frequency fr (Hz) of real read operation in FIG. 13.

The scan speed of the shift register 202 can be increased to a certain degree if data of the idle read period "K" is not used as image information. Since the X-irradiation of the radiation time during the final idle read operation can be shortened, the loss of signal charges in the latter half of real read operation can be decreased.

As long as the time of the idle read period "K" is much shorter than that of the real read period "H", a decrease in outputs from some photoelectric conversion elements in the real read period "H" can be ignored even upon irradiation of X-rays during the idle read period "K". Since data of the real read period "H" is used as image information, the operation time cannot be arbitrarily shortened and is optimally designed in consideration of the switching ability of the TFT.

(Fourth Embodiment)

Figure 14:
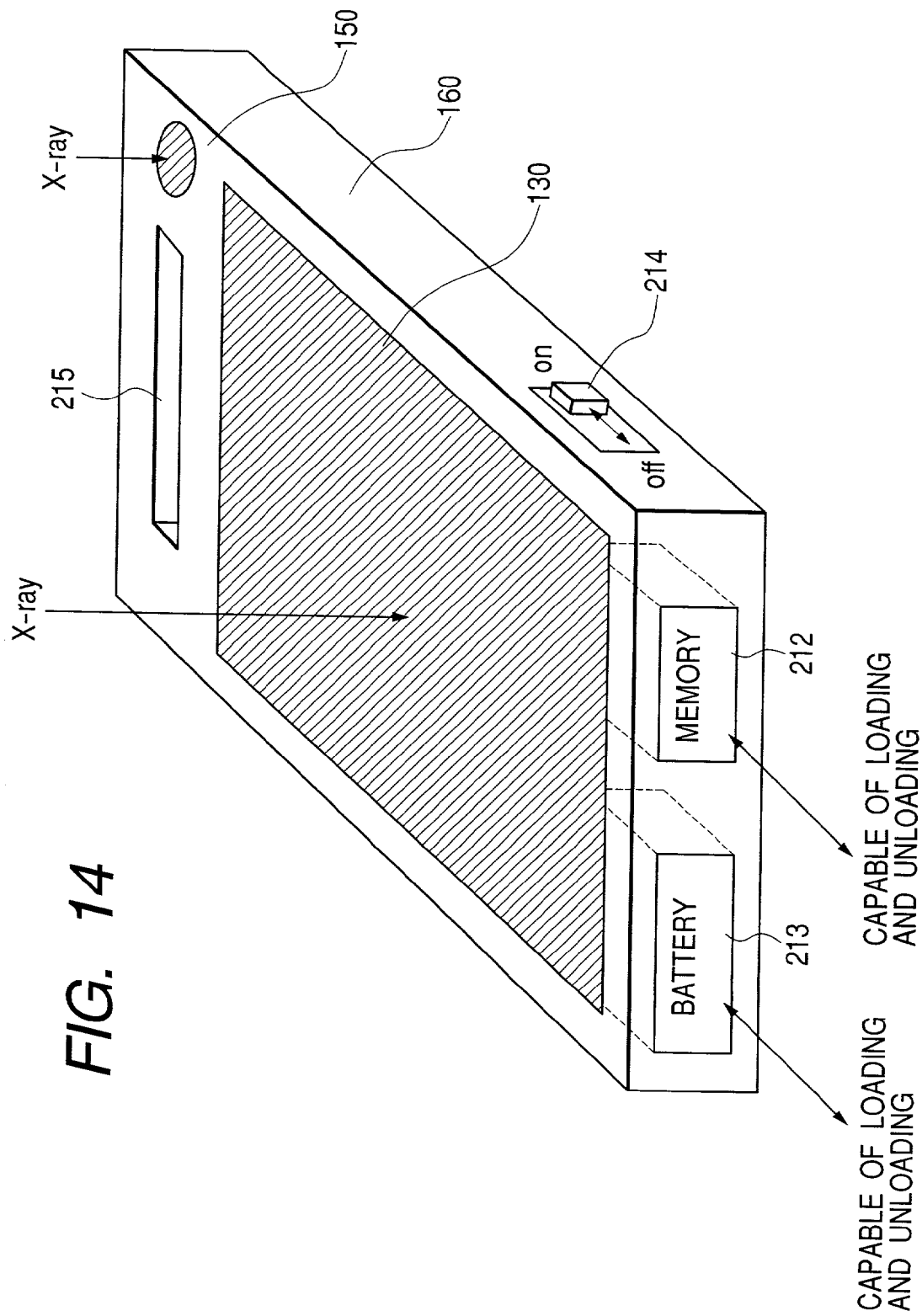
FIG. 14 is a schematic view showing the mechanical structure of an X-ray image pick-up apparatus according to the fourth embodiment of the present invention.
Figure 15:
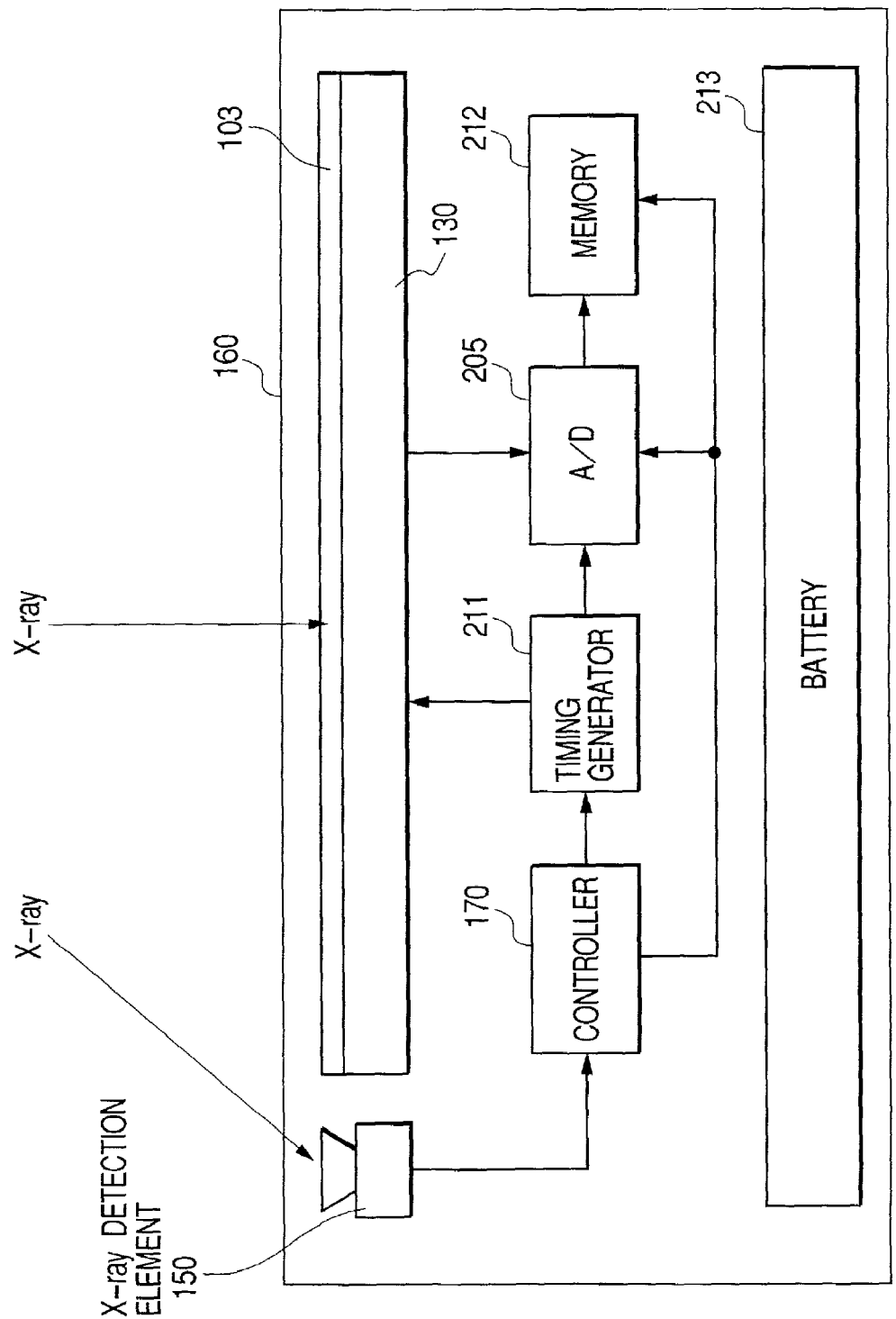
FIG. 15 is a block diagram showing the internal arrangement of FIG. 14.
Figure 16:
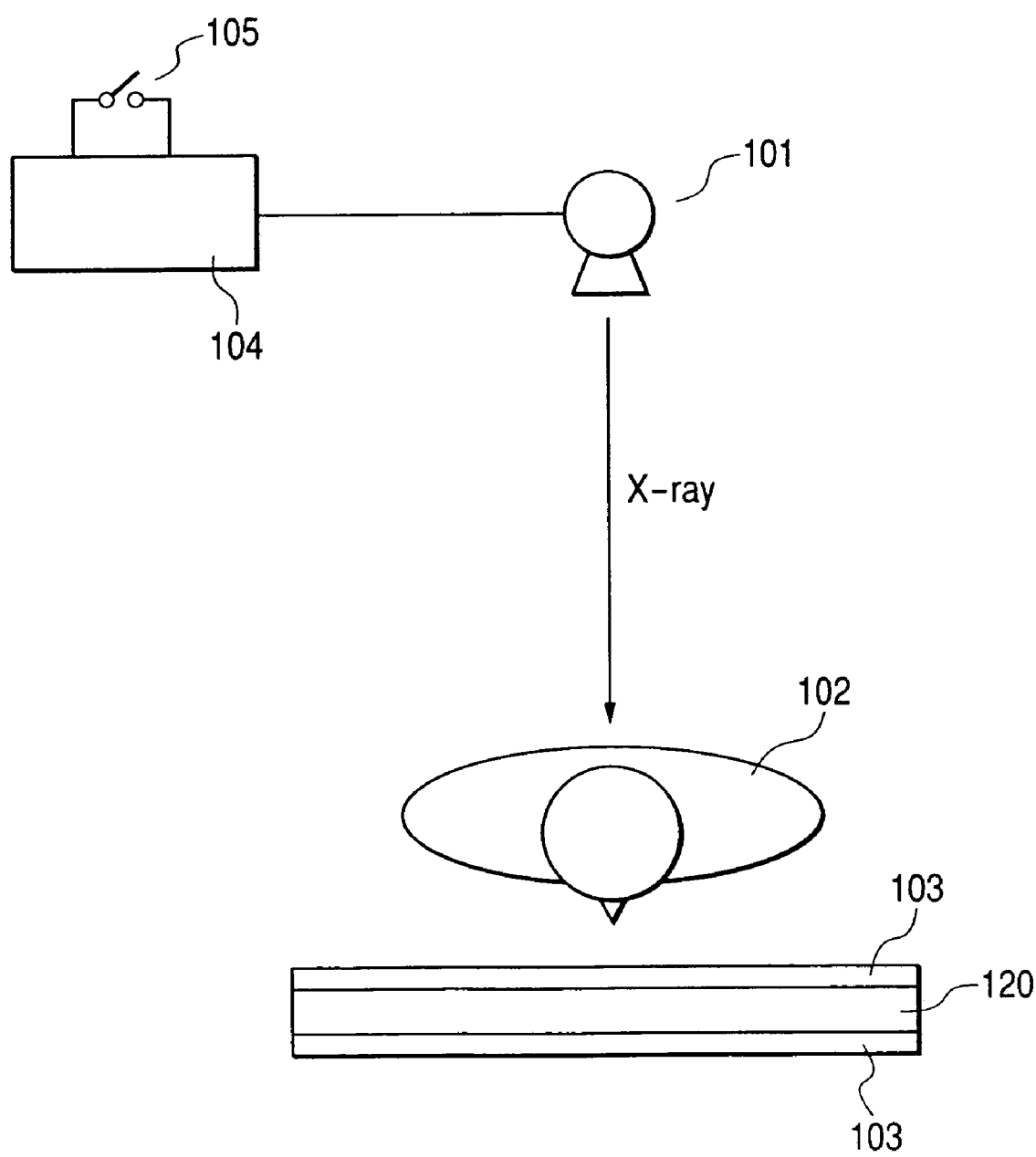
FIG. 16 is a block diagram showing the schematic arrangement of a conventional analog X-ray image pick-up system.
Figure 17:
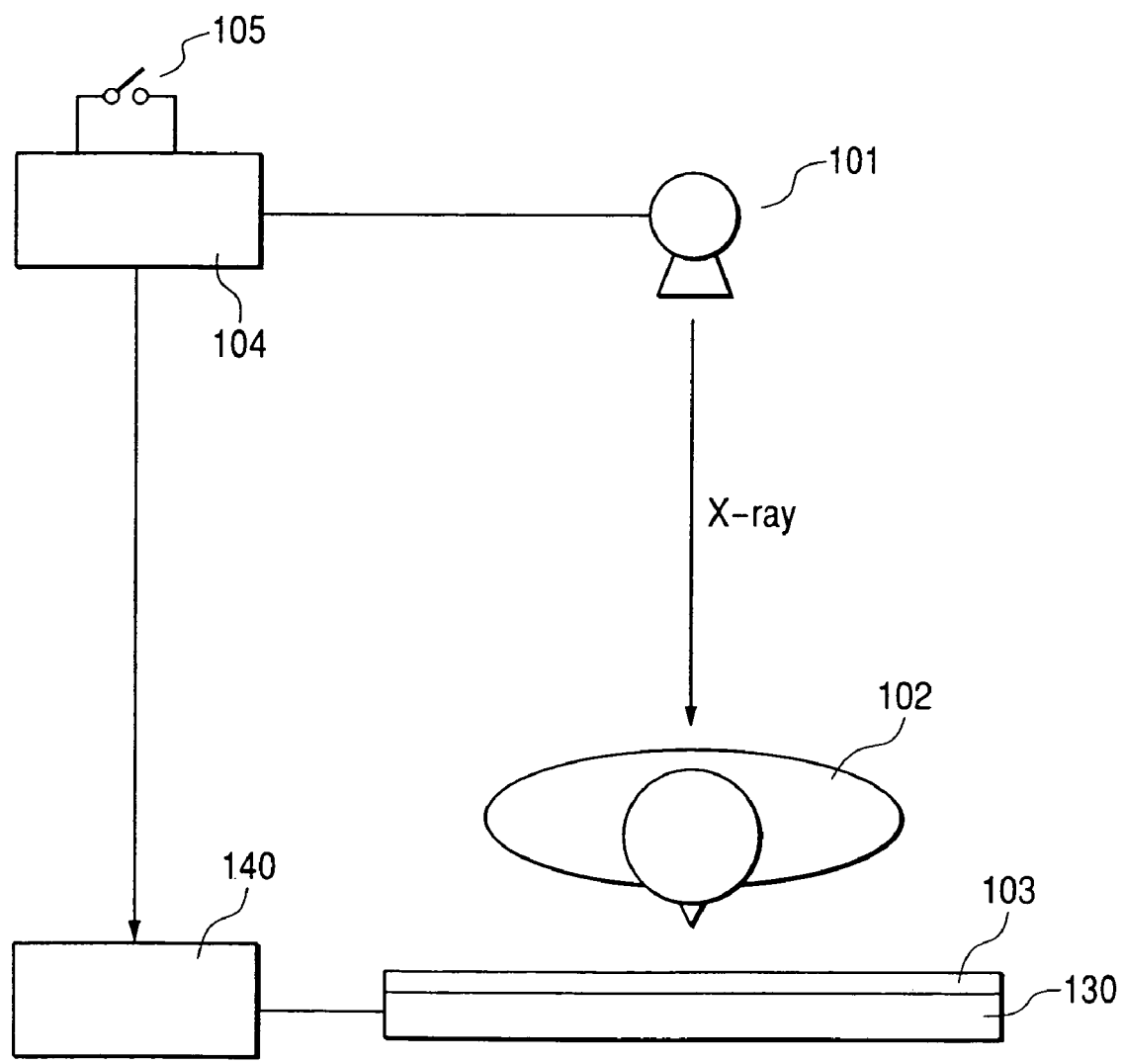
FIG. 17 is a block diagram showing the schematic arrangement of a conventional digital X-ray image pick-up system.

FIG. 14 is a schematic view showing the mechanical structure of an X-ray image pick-up apparatus according to the fourth embodiment of the present invention. A sensor unit for detecting radiation may be a known one with the arrangement shown in FIG. 2. FIG. 15 is a block diagram showing the internal arrangement of FIG. 14. In FIGS. 14 and 15, a timing generator 211 serves as a driving circuit for generating clock signals to be input to shift registers 202 and 203. A memory 212 stores a digital signal output from an A/D conversion circuit unit 205. A battery 213 is used for the X-ray image pick-up apparatus. A mechanical start switch 214 controls ON/OFF switching of the main power supply of the X-ray image pick-up apparatus. A grip 215 is used to carry the X-ray image pick-up apparatus. The same reference numerals as in FIGS. 1 and 2 denote the same parts.

In the fourth embodiment, the battery 213 and memory 212 are loadable/unloadable into/from the X-ray image pick-up apparatus. The X-ray image pick-up apparatus can be continuously used by exchanging a dead battery 213 with a new one or exchanging the memory 212 with a new one when its data accumulation capacity becomes full.

In this case, the memory 212 is assumed to be a hard disk, magneto-optical disk, or RAM (Random Access Memory). When a RAM is adopted as the memory 212, it requires a power supply such as a button battery. For an essentially nonvolatile memory not requiring any power supply, the power supply can be omitted. An MRAM using a magnetic substance is preferably mounted because it can hold information even upon irradiation of radiation. The unloaded RAM can also transfer image pick-up data to a computer via a reader.

When the start switch 214 is OFF, the X-ray image pick-up apparatus is not powered on. When the start switch 214 is turned on, a solid-state image pick-up device 130 changes to idle read operation. Idle read operation is repeated until an X-ray detection element 150 detects emission of X-rays. After emission of X-rays starts, the X-ray detection element 150 detects the start of emission of X-rays, and outputs a signal representing this emission to a controller 170. The controller 170 uses a driving circuit to cause the timing generator 211 to generate, e.g., a clock signal for driving the solid-state image pick-up device 130. The timing generator 211 outputs the generated clock signal or the like to the solid-state image pick-up device 130.

After that, the solid-state image pick-up device 130 changes from idle read operation to accumulation operation. If the X-ray detection element detects the stop of emission of X-rays, the solid-state image pick-up device 130 changes from accumulation operation to real read operation. That is, the solid-state image pick-up device 130 outputs an analog signal to the A/D conversion circuit unit 205. The A/D conversion circuit unit 205 converts the analog signal into a digital signal in accordance with an instruction from the controller 170, and outputs the digital signal to the memory 212. The memory 212 stores the output digital signal in accordance with an instruction from a controller 210.

If the start switch 214 is manually turned off by a radiation technician or the like after the end of real reading, the solid-state image pick-up device 130 can change to idle read operation after the end of real reading to pick up the second X-ray image as far as the memory capacity of the memory 212 covers a plurality of frames.

During the above operation, the battery 213 supplies power to the solid-state image pick-up device 130, X-ray detection element 150, controller 210, timing generator 211, A/D conversion circuit unit 205 and memory 212 in a chassis 160. The memory 212 and battery 213 are exchanged in the above manner as needed.

What is claimed is:

1. A radiation image pick-up apparatus comprising:
   conversion means for converting radiation into an electrical signal;
   accumulation means for performing an accumulation operation of accumulating the electrical signal converted by said conversion means;
   read means for reading out the electrical signal accumulated in said accumulation means;
   detection means for detecting start and end of irradiation of the radiation;
   a driving circuit for driving said accumulation means to perform the accumulation operation responsive to a detection of the start of irradiation of the radiation by said detection means, and for driving said read means responsive to a detection of the end of irradiation by said detection means; and
   control means for controlling said driving circuit,
   wherein said control means performs an idling operation of said conversion means before the accumulation operation, with the idling operation continuing until the start of irradiation of the radiation is detected by the detection means, and
   wherein an operation time Ta of the idling operation and a time Tr for driving said read means in order to read out image information satisfy $Tr \geq Ta$.

2. An apparatus according to claim 1, wherein said control means stops driving said read means by said driving circuit or an external input when read of the electrical signal by said read means ends.

3. An apparatus according to claim 1, wherein said control means is an IC chip circuit.

4. An apparatus according to claim 1, further comprising:
   an analog/digital converter for converting into a digital signal the electrical signal read out by the read means; and
   a memory for storing electrical signals converted by said analog/digital converter.

5. An apparatus according to claim 4, wherein said memory includes one of a hard disk, a magneto-optical disk, and a random access memory.

6. An apparatus according to claim 5, wherein said memory is loadable/unloadable into/from a main body of the radiation image pick-up apparatus.

7. An apparatus according to claim 1, further comprising a loadable/unloadable battery for driving a main body of the radiation image pick-up apparatus.

8. An apparatus according to claim 1, wherein said conversion means comprises:
   a wavelength converter for converting the radiation into light; and
   photoelectric conversion means for converting the light converted by said wavelength converter into an electrical signal.

9. An apparatus according to claim 8, wherein said wavelength converter is disposed at a position in tight contact with said photoelectric conversion means.

10. An apparatus according to claim 8, wherein said wavelength converter contains one material selected from the group consisting of $Gd_2O_2S$, $Gd_2O_3$, and CsI as a major component.

11. An apparatus according to claim 1, wherein said conversion means contains one material selected from the group consisting of lead iodide, mercurous iodide, selenium, cadmium telluride, gallium arsenide, gallium phosphide, zinc sulfide, and silicon for directly converting the radiation into an electric charge.

12. An apparatus according to claim 1, wherein said conversion means and said read means contain amorphous silicon and are formed by the same step.

13. A radiation image pick-up system comprising:
   a radiation image pick-up apparatus defined in claim 1; and
   a radiation source for emitting radiation to said radiation image pick-up apparatus.

14. A method of driving a radiation image pick-up apparatus for obtaining image information by converting radiation which irradiates an object to be examined into an electrical signal by a conversion element for converting the radiation into an electrical signal, comprising steps of:
   an accumulation operation of detecting start of irradiation of the radiation and accumulating the converted electrical signal;
   a read operation of detecting end of irradiation of the radiation and reading out the accumulated electrical signal; and an idling operation of performing idle read of the conversion element before the accumulation operation,
wherein the idling operation continues until the start of irradiation of the radiation is detected, and
wherein an operation time Ta of the idling operation and an operation time Tr of the read operation satisfy Tr≧Ta.

15. A method according to claim 14, further comprising a step of an operation of adding frame data in the idling operation immediately before the accumulation operation and frame data in the read operation, and a step of outputting a sum as an image.

* * * * *